(12) United States Patent
Hartsuff et al.

(10) Patent No.: X8967
(45) Date of Patent: Jul. 17, 1835

(54) POTASH, MANUFACTURING

(76) Inventors: Henry Hartsuff; Cyrus French

Henry Hartsuff and Cyrus French

Letters Patent

The Schedule referred to in these Letters Patent and making part of the same containing a description in the words of the said Henry Hartsuff & Cyrus French themselves of their improvement in the manufacture of Pot ash.

To all to whom these presents shall come; Be it known that We Henry Hartsuff of Tyre in the County of Seneca and Cyrus French of Aurelius in the County of Cayuga and State of New York have invented a new and useful improvement in the manufacture of Pot ash and that the following is an exact description thereof. The improvement consists in an improved mode of filling the leach tubs in the materials used in filling the same and in saturating the same whilst filling and extracting the lye therefrom. the following [illegible] Take the common leach tub First: In filling the leach tubs, in the bottom put sticks and straw in the usual way. pack down upon this three inches of slacked lime, then add a layer of about five inches of ashes, saturate this well with weak lye at boiling heat, in which common salt has been dissolved in the proportion of about three quarters of a pound of salt to a bushel of ashes. Then add a layer of about half an inch of dry slacked lime: spread evenly over the surface of the ashes, then add another layer of ashes of five inches in thickness as above and saturate in the same way, and so on in alternate layers of ashes and lime as above saturated in the same manner, for four and not to exceed five layers of ashes in all. It is intended to use about one bushel of lime to twelve bushels of good house ashes; but in case field ashes are used, more lime is necessary, and less salt, in proportion to the goodness of the ashes. Second after the ashes & lime are all in the leach tub and saturated as above, then cold weak lye or cold water may be used, until the lye is all ran off. It is much better to use weak lye than water, until the strong lye is all leaked out of the ashes. Salt and lime have been used heretofore

United States Patent Patent No.: X8967

[illegible] the manufacture of pot ashes but not in the manner and in the pro
portions and with the hot weak lye above mentioned. What we claim
as our invention and not previously known is the use of dry slacked lime
and ashes in alternate layers and saturating each layer of ashes with
boiling weak lye in which common salt has been dissolved by which
the strength of the ashes is more perfectly obtained in a shorter
time and with less expense and labor Exd. Witnesses
W.J.S. Stephen Lombard
Charles Hopping Henry Hartsuff
Cyrus French (513 Words)